US012595353B2

(12) United States Patent
Kim et al.

(10) Patent No.: US 12,595,353 B2
(45) Date of Patent: Apr. 7, 2026

(54) PLASTICIZER COMPOSITION AND RESIN COMPOSITION COMPRISING THE SAME

(71) Applicant: LG CHEM, LTD., Seoul (KR)

(72) Inventors: Hyun Kyu Kim, Daejeon (KR); Jeong Ju Moon, Daejeon (KR); Joo Ho Kim, Daejeon (KR); Seok Ho Jeong, Daejeon (KR); Eun Suk Kim, Daejeon (KR); Seung Taek Woo, Daejeon (KR); Woo Hyuk Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 439 days.

(21) Appl. No.: 18/029,723

(22) PCT Filed: Jan. 28, 2022

(86) PCT No.: PCT/KR2022/001617
§ 371 (c)(1),
(2) Date: Mar. 31, 2023

(87) PCT Pub. No.: WO2022/164268
PCT Pub. Date: Aug. 4, 2022

(65) Prior Publication Data

US 2023/0407049 A1 Dec. 21, 2023

(30) Foreign Application Priority Data

Jan. 29, 2021 (KR) ........................ 10-2021-0013022

(51) Int. Cl.

| | |
|---|---|
| ***C08K 5/12*** | (2006.01) |
| ***C08K 5/00*** | (2006.01) |
| ***C08K 5/11*** | (2006.01) |
| ***C08L 27/06*** | (2006.01) |

(52) U.S. Cl.
CPC .............. *C08K 5/12* (2013.01); *C08K 5/0016* (2013.01); *C08K 5/11* (2013.01); *C08L 27/06* (2013.01); *C08K 2201/014* (2013.01)

(58) Field of Classification Search
CPC .. C08K 2201/014; C08K 5/0016; C08K 5/10; C08K 5/11; C08K 5/12; C08L 27/06
See application file for complete search history.

(56) References Cited

U.S. PATENT DOCUMENTS

| | | | |
|---|---|---|---|
| 2002/0198402 A1 | 12/2002 | Bohnen et al. | |
| 2016/0272780 A1 | 9/2016 | Kim et al. | |
| 2016/0376219 A1 | 12/2016 | Kim et al. | |
| 2017/0369656 A1* | 12/2017 | Kim ........................ | C08K 5/134 |
| 2018/0291179 A1 | 10/2018 | Kim et al. | |
| 2022/0162421 A1 | 5/2022 | Kim et al. | |
| 2022/0185988 A1 | 6/2022 | Kim et al. | |

FOREIGN PATENT DOCUMENTS

| | | | |
|---|---|---|---|
| CN | 106187750 | A | 12/2016 |
| KR | 10-2002-0085812 | A | 11/2002 |
| KR | 10-2015-0093608 | A | 8/2015 |
| KR | 10-2016-0119696 | A | 10/2016 |
| KR | 10-2016-0119697 | A | 10/2016 |
| KR | 10-2019-0022286 | A | 3/2019 |
| KR | 10-2020-0110104 | A | 9/2020 |
| KR | 10-2020-0127877 | A | 11/2020 |
| KR | 10-2020-0127890 | A | 11/2020 |
| WO | 2016/163744 | A1 | 10/2016 |

OTHER PUBLICATIONS

International Search Report (with partial translation) and Written Opinion dated May 9, 2022, for corresponding International Patent Application No. PCT/KR2022/001617.
Extended European search report issued on Jun. 11, 2024 for the corresponding European patent application 22746294.2.

* cited by examiner

*Primary Examiner* — Pancham Bakshi
(74) *Attorney, Agent, or Firm* — Morgan, Lewis & Bockius LLP

(57) ABSTRACT

The present disclosure is characterized in comprising an isophthalate-based composition and a citrate-based composition, wherein the isophthalate-based composition comprises di(2-ethylhexyl) isophthalate, hexyl(2-ethylhexyl) isophthalate and dihexyl isophthalate, the citrate-based composition comprises trihexyl citrate, and the hexyl group of the isophthalate and the hexyl group of the citrate are derived from an isomer mixture of hexyl alcohols. If the composition is applied to a resin, migration resistance and stress resistance may be improved, and on the other hand, mechanical properties may be improved.

19 Claims, 1 Drawing Sheet

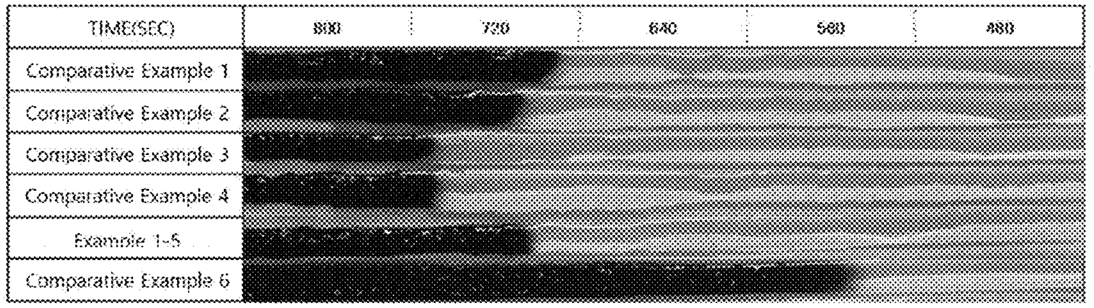
TIME(SEC)
800
720
640
560
480
Comparative Example 1
Comparative Example 2
Comparative Example 3
Comparative Example 4
Example 1~5
Comparative Example 6

PLASTICIZER COMPOSITION AND RESIN COMPOSITION COMPRISING THE SAME

CROSS-REFERENCE TO RELATED APPLICATIONS

The present application claims the benefit of priority based on Korean Patent Application No. 10-2021-0013022, filed on Jan. 29, 2021, the entire contents of which are incorporated herein by reference.

TECHNICAL FIELD

The present invention relates to a plasticizer composition including an isophthalate-based composition and a citrate-based composition, and a resin composition comprising the same.

BACKGROUND ART

Generally, plasticizers are obtained through the reaction of alcohols with polycarboxylic acids such as phthalic acid and adipic acid to form corresponding esters. In addition, considering the internal and external regulations on harmful phthalate-based plasticizers to the human body, studies are being continued on plasticizer compositions which may replace phthalate-based plasticizers such as isophthalate-based, adipate-based and other polymer-based plasticizers.

Meanwhile, regardless of the type of industry including plastisol type of industry of flooring materials, wallpaper, soft and hard sheets, etc., calendaring type of industry, extrusion/injection compound type of industry, and the demand for eco-friendly products is increasing. In order to reinforce the quality properties, processability and productivity of the finished products, a suitable plasticizer is required considering discoloration, migration, mechanical properties, etc.

According to the properties required by the types of industry in various areas of usage, such as tensile strength, elongation rate, light resistance, migration, gelling properties and absorption rate, supplementary materials such as a plasticizer, a filler, a stabilizer, a viscosity decreasing agent, a dispersant, a defoaming agent and a foaming agent are mixed with a PVC resin.

For example, in the case of applying di(2-ethylhexyl) isophthalate (DEHTP) which is relatively cheap and widely used among plasticizer compositions which may be applied to PVC, hardness or sol viscosity was high, absorption rate of a plasticizer was relatively slow, and migration and stress migration were not good.

As improvements on the above limitations, the application of a transesterification product with butanol as a plasticizer, in a composition including DEHTP may be considered. In this case, plasticization efficiency is improved, but volatile loss or thermal stability is inferior and mechanical properties are somewhat degraded, and the improvement of physical properties is required. Accordingly, generally, there is no solution but employing a method compensating the defects through mixing with a second plasticizer at the present time.

However, in the case of applying the second plasticizer, there are drawbacks of generating unexpected defects as follows: the change of the physical properties is hard to predict; the application may become a factor of increasing the unit cost of the product; the improvement of the physical properties is not clearly shown except for specific cases; and problems relating to compatibility with a resin may arise.

In addition, if a material like tri(2-ethylhexyl) trimellitate or triisononyl trimellitate is applied as a trimellitate-based product in order to improve the inferior migration and loss properties and light resistance of the DEHTP products, migration or loss properties may be improved, but plasticization efficiency may be degraded, and a great deal of the material is required to be injected to provide a resin with suitable plasticization effect, and considering the relatively high unit price of the products, commercialization thereof is impossible.

Likewise, if the materials are mixed, all excellent physical properties may not be accomplished, but cases of accomplishing only inferior physical properties may arise, and there are tasks to be solved in this art including the defects of arising very frequent cases of diluting the advantages of the components mixed not to serve functions as improved products.

Products for solving the environmental issues of the conventionally used phthalate-based products or eco-friendly plasticizers for improving the environmental issues of the phthalate-based products, have very excellent specific physical properties, but inferior other specific properties, and could not be used significantly. Accordingly, the development of blended plasticizer products which have excellent balance among physical properties without showing any inferior properties and may accomplish only the advantages of two components if blended, is required.

DISCLOSURE OF THE INVENTION

Technical Problem

The present invention provides a plasticizer composition which may markedly improve an absorption rate, light resistance, migration resistance and stress resistance in contrast to the conventional plasticizer.

Technical Solution

To solve the tasks, the present invention provides a plasticizer composition and a resin composition.

(1) The present invention provides a plasticizer composition comprising an isophthalate-based composition and a citrate-based composition, wherein the isophthalate-based composition comprises dihexyl isophthalate, hexyl(2-ethylhexyl) isophthalate and di(2-ethylhexyl) isophthalate, the citrate-based composition comprises trihexyl citrate, a hexyl group of the isophthalate and a hexyl group of the citrate are derived from an isomer mixture of hexyl alcohols, and the isomer mixture of hexyl alcohols comprises two or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol.

(2) The present invention provides the plasticizer composition according to (1) above, wherein the isophthalate-based composition comprises: 0.5 to 50.0 wt % of dihexyl isophthalate; 3.0 to 70.0 wt % of hexyl(2-ethylhexyl) isophthalate; and 0.5 to 95.0 wt % of di(2-ethylhexyl) isophthalate.

(3) The present invention provides the plasticizer composition according to (1) or (2) above, wherein the citrate-based composition comprises one or more citrates of Formula 1 below.

[Formula 1]

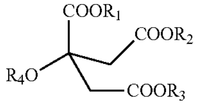

In Formula 1, $R_1$ to $R_3$ are each independently a n-hexyl group, a branched hexyl group or a cyclopentyl methyl group, and $R_4$ is hydrogen.

(4) The present invention provides the plasticizer composition according to any one among (1) to (3) above, wherein the isophthalate-based composition and the citrate-based composition are comprised in a weight ratio of 95:5 to 5:95.

(5) The present invention provides the plasticizer composition according to any one among (1) to (4) above, wherein the isophthalate-based composition and the citrate-based composition are comprised in a weight ratio of 95:5 to 50:50.

(6) The present invention provides the plasticizer composition according to any one among (1) to (5) above, wherein the isomer mixture of hexyl alcohols comprises 2-methylpentanol and 3-methylpentanol.

(7) The present invention provides the plasticizer composition according to any one among (1) to (6) above, wherein the isomer mixture of hexyl alcohols comprises 40 parts by weight or more of a branched alcohol based on 100 parts by weight of the isomer mixture.

(8) The present invention provides the plasticizer composition according to any one among (1) to (7) above, wherein the isomer mixture of hexyl alcohols comprises 50 to parts by weight of a branched alcohol based on 100 parts by weight of the isomer mixture.

(9) The present invention provides the plasticizer composition according to any one among (1) to (8) above, wherein the isomer mixture of hexyl alcohols further comprises 1-hexanol.

(10) The present invention provides the plasticizer composition according to any one among (1) to (9) above, wherein the isomer mixture of hexyl alcohols comprises 40 parts by weight or less of the 1-hexanol based on 100 parts by weight of the isomer mixture.

(11) The present invention provides the plasticizer composition according to any one among (1) to (10) above, wherein the isomer mixture of hexyl alcohols further comprises 4-methylpentanol.

(12) The present invention provides the plasticizer composition according to any one among (1) to (11) above, wherein the isomer mixture of hexyl alcohols further comprises cyclopentyl methanol.

(13) The present invention provides the plasticizer composition according to any one among (1) to (12) above, wherein the isomer mixture of hexyl alcohols comprises 20 parts by weight or less of the cyclopentyl methanol based on 100 parts by weight of the isomer mixture.

(14) The present invention provides a resin composition comprising 100 parts by weight of a resin, and 5 to 150 parts by weight of the plasticizer composition according to any one among (1) to (13) above.

(15) The present invention provides the resin composition according to (14) above, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, polylactic acid, natural rubber and synthetic rubber.

Advantageous Effects

The plasticizer composition according to an embodiment of the present invention, if used in a resin composition, may markedly improve an absorption rate, light resistance, migration resistance and stress resistance in contrast to the conventional plasticizer.

BRIEF DESCRIPTION OF THE INVENTION

FIG. 1 is a diagram showing the evaluation results of the carbonization properties of the plasticizer compositions according to Examples 1-5 of the present invention and the plasticizer compositions according to Comparative Examples 1 to 4, and 6.

MODE FOR CARRYING OUT THE INVENTION

It will be understood that terms or words used in the present disclosure and claims should not be interpreted as having a meaning that is defined in common or in dictionaries, however should be interpreted in consistent with the technical scope of the present invention based on the principle that inventors may appropriately define the concept of the terms to explain the invention at his best method.

DEFINITION OF TERMS

The term "composition" as used in the present disclosure includes a mixture of materials including the corresponding composition as well as a reaction product and a decomposition product formed from the materials of the corresponding composition.

The "straight vinyl chloride polymer" as used in the present disclosure may be one type of vinyl chloride polymers and polymerized by suspension polymerization, bulk polymerization, etc. This polymer has porous particles which have a large number of pores, a size of tens to hundreds of micrometers, no cohesiveness, and excellent flowability.

The "paste vinyl chloride polymer" as used in the present disclosure may be one type of vinyl chloride polymers and polymerized by microsuspension polymerization, microseed polymerization, emulsion polymerization, etc. This polymer has minute and dense particles without pores, a size of tens to thousands of nanometers, cohesiveness, and inferior flowability.

The terms "comprising", and "having" and the derivatives thereof in the present invention, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Methods

In the present disclosure, the content analysis of the components in a composition is conducted by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 μl, initial value: 70° C./4.2 min, end value: 280° C./7.8 min, program rate: 15° C./min).

In the present disclosure, "hardness" means Shore hardness (Shore "A" and/or Shore "D") at 25° C. and is measured in conditions of 3T 10s using ASTM D2240. The hardness may be an index for evaluating plasticization efficiency, and the lower the value is, the better the plasticization efficiency is.

In the present disclosure, "tensile strength" is obtained according to an ASTM D638 method by drawing a specimen in a cross head speed of 200 mm/min (1T) using a test apparatus of U.T.M (manufacturer: Instron, model name: 4466), measuring a point where the specimen is cut, and calculating according to the following Mathematical Formula 1:

$$\text{Tensile strength (kgf/cm}^2\text{)}=\text{load value (kgf)/thickness (cm)}\times\text{width (cm)} \quad \text{[Mathematical Formula 1]}$$

In the present disclosure, "elongation rate" is obtained according to an ASTM D638 method by drawing a specimen in a cross head speed of 200 mm/min (1T) using the U.T.M, measuring a point where the specimen is cut, and calculating according to the following Mathematical Formula 2:

$$\text{Elongation rate (\%)}=\text{length after elongation/initial length}\times 100 \quad \text{[Mathematical Formula 2]}$$

In the present disclosure, "migration loss" is obtained according to KSM-3156, by which a specimen with a thickness of 2 mm or more is obtained, glass plates are attached onto both sides of the specimen, and a load of 1 kgf/cm 2 is applied. The specimen is stood in a hot air circulation type oven (80° C.) for 72 hours, then taken out therefrom and cooled at room temperature for 4 hours. Then, the glass plates attached onto both sides of the specimen are removed, the weights before and after standing a glass plate and a specimen plate in the oven are measured, and the migration loss is calculated according to Mathematical Formula 3 below.

$$\text{Migration loss (\%)}=\{[(\text{weight of initial specimen})-(\text{weight of specimen after standing in oven})]/(\text{weight of initial specimen})\}\times 100 \quad \text{[Mathematical Formula 3]}$$

In the present disclosure, "volatile loss" is obtained by processing a specimen at 80° C. for 72 hours and then, measuring the weight of the specimen.

$$\text{Volatile loss (wt \%)}=\{[(\text{weight of initial specimen})-(\text{weight of specimen after processing})]/(\text{weight of initial specimen})\}\times 100 \quad \text{[Mathematical Formula 4]}$$

In the case of the various measurement conditions, the details of the conditions of the temperature, the speed of revolution, the time, etc., may be somewhat changed according to situations, and if the conditions are different, a measurement method and its conditions are required to be separately indicated.

Hereinafter, the present invention will be explained in more detail to assist the understanding of the present invention.

According to an embodiment of the present invention, the plasticizer composition is characterized in including an isophthalate-based composition and a citrate-based composition, wherein the isophthalate-based composition includes dihexyl isophthalate, hexyl(2-ethylhexyl) isophthalate and di(2-ethylhexyl) isophthalate, the citrate-based composition includes trihexyl citrate, the hexyl group of the isophthalate and the hexyl group of the citrate are derived from an isomer mixture of hexyl alcohols, and the isomer mixture of hexyl alcohols includes two or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol.

As a component of the plasticizer composition according to an embodiment of the present invention, an isophthalate-based composition is used, and the isophthalate-based composition includes dihexyl isophthalate, hexyl(2-ethylhexyl) isophthalate and di(2-ethylhexyl) isophthalate.

Generally, an isophthalate-based composition uses alcohols having a large carbon number difference so as to have advantages of each of an alcohol having a small carbon number and an alcohol having a large carbon number. However, in the present invention, it was confirmed that excellent plasticization efficiency, not inferior mechanical properties, excellent stress resistance and balance among physical properties could be achieved through combining hexanol and 2-ethylhexanol as two alcohols having not a big difference of carbon numbers.

In addition, according to an embodiment of the present invention, in the isophthalate-based composition, by deriving a hexyl group from a hexanol of an isomer mixture, maximized synergistic effects could be obtained when mixed with a citrate-based composition which is another component.

The isophthalate-based composition may include 0.5 to 50.0 wt % of the dihexyl isophthalate; 3.0 to 70.0 wt % of the hexyl(2-ethylhexyl) isophthalate; and 0.5 to 95.0 wt % of the di(2-ethylhexyl) isophthalate. Preferably, the isophthalate-based composition may include 0.5 to 30.0 wt % of the dihexyl isophthalate; 10.0 to 60.0 wt % of the hexyl(2-ethylhexyl) isophthalate; and 35.0 to 90.0 wt % of the di(2-ethylhexyl) isophthalate. With such a composition ratio, there are advantages in that the reproducibility of the above-described effects is excellent, and balance among physical properties is suitable.

The plasticizer composition according to an embodiment of the present invention uses a citrate-based composition as another component, and the citrate-based composition includes trihexyl citrate. In this case, a hexyl group is derived from an hexanol of an isomer mixture.

As described above, in the application of the citrate-based composition, if trihexyl citrate prepared by using an alcohol having 6 carbon atoms is applied, a suitable degree of an absorption rate could be secured in contrast to a citrate having less than 6 carbon atoms, processability may be improved, and tensile strength, elongation rate and volatile loss may be largely improved. In contrast to a citrate having greater than 6 carbon atoms, plasticization efficiency may be excellent, and migration resistance and stress resistance may be largely improved.

Meanwhile, the isophthalate-based composition tends to show relatively inferior migration resistance, stress resistance, and elongation rate among mechanical properties, and excellent light resistance, volatile loss, and carbonization properties in contrast to the conventionally used plasticizer. In addition, the citrate-based composition has inferior thermal properties and tensile strength but excellent plasticization efficiency, migration resistance and stress resistance in contrast to the conventionally used plasticizer. Further, if the two components are mixed, desired effects could be sufficiently achieved though the amount used of the plasticizer is reduced, and some physical properties may be improved with the decrease of the amount used.

Generally, if two compositions are mixed, diluted results of the advantages and disadvantages of two components are shown, but if the isophthalate-based composition and the citrate-based composition, having the characteristics of the present invention are mixed, only the advantages of two components may be shown. In the two components, the same hexyl group is applied, but the hexyl group is applied through a hexanol of an isomer mixture, and accordingly, such synergistic effects could be achieved.

Such synergistic effects may not be achieved without the application of the common hexyl group and the application of the isomer mixture of hexyl alcohols, and the diluting results of each other of the advantages and disadvantages of the two components may be shown.

In order to maximize such synergistic effects, the plasticizer composition of the present invention may include the isophthalate-based composition and the citrate-based composition in a weight ratio of 95:5 to 5:95, 95:5 to 10:90, 95:5 to 20:80, 95:5 to 30:70, 95:5 to 50:50, 95:5 to 70:30, 90:10 to 10:90, 90:10 to 30:70, 90:10 to 50:50 or 90:10 to 70:30. In the application of the plasticizer composition of the present invention, considering that the isophthalate-based composition has better thermal stability in contrast to the citrate-based composition, if working under high-temperature environments is required, a plasticizer composition having a relatively small amount of the citrate-based composition and a large amount of the isophthalate-based composition may be used. On the contrary, considering that the citrate-based composition has better mechanical properties in contrast to the isophthalate-based composition, a plasticizer composition having a large amount of the citrate-based composition and a small amount of the isophthalate-based composition may be used for products requiring particularly excellent mechanical properties.

The citrate-based composition according to an embodiment of the present invention may include one or more citrates of Formula 1 below.

[Formula 1]

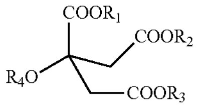

In Formula 1, $R_1$ to $R_3$ are each independently a n-hexyl group, a branched hexyl group or a cyclopentyl methyl group, and $R_4$ is hydrogen.

According to an embodiment of the present invention, the hexyl group of the isophthalate and the hexyl group of the citrate are derived from an isomer mixture of hexyl alcohols.

The isomer mixture of hexyl alcohols includes two or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol.

According to the alcohols included in such a hexyl alcohol isomer, the hexyl groups of the isophthalate and the citrate may be determined, and the ratio of components in a final composition may be determined according to the component ratio of alcohols reacted.

The plasticizer composition according to an embodiment of the present invention may include 2-methylpentanol and 3-methylpentanol in the isomer mixture of hexyl alcohols, and may include 1-hexanol, 2-methylpentanol and 3-methylpentanol, 2-methylpentanol, 3-methylpentanol and 4-methylpentanol, or 1-hexanol, 2-methylpentanol, 3-methylpentanol and 4-methylpentanol in some cases. If 2-methylpentanol and 3-methylpentanol are included together, balance among physical properties may be maintained, and excellent effects may be obtained in respect of volatile loss.

The branched hexyl alcohol including one or more among 2-methylpentanol, 3-methylpentanol and 4-methylpentanol may be included in 40 parts by weight or more, 50 parts by weight or more, 60 parts by weight or more, preferably, 65 parts by weight or more, 70 parts by weight or more based on 100 parts by weight of the isomer mixture. As the maximum amount, all may be the branched type, or 99 parts by weight or less, 98 parts by weight, preferably, 95 parts by weight or less, or 90 parts by weight or less may be included. If the branched hexyl alcohol is included in this range, the improvement of mechanical properties may be expected.

In addition, the linear alcohol of 1-hexanol may be included in 50 parts by weight or less, 40 parts by weight or less, preferably, 30 parts by weight or less based on 100 parts by weight of the isomer mixture. The 1-hexanol may not be present in the component but may be included at least 2 parts by weight or more, and in this case, advantages of maintaining balance among physical properties and improving mechanical properties may be achieved. The linear alcohol is theoretically known to show excellent effects, but different results from such theoretical results were obtained in the present invention. It was confirmed that if an isomer mixture including a branched alcohol is applied, balance among physical properties was excellent even further.

The plasticizer composition according to an embodiment of the present invention may further include cyclopentyl methanol in the above-explained isomer mixture of hexyl alcohols. Preferably, by further including the cyclopentyl methanol, balance among physical properties may be maintained, and volatile loss may be improved even further.

In this case, the cyclopentyl methanol may be 20 parts by weight or less, preferably, 15 parts by weight or less, more preferably, 10 parts by weight or less based on 100 parts by weight of the isomer mixture, or may not be present, and in order to obtain effects thereby, the minimum amount may be 2 parts by weight.

Particularly, according to the characteristics including the degree of the ratio of the branched alkyl group among total alkyl radicals present in a final composition, further, and the degree of the ratio of a specific branched alkyl radical present among the branched alkyl group, the balance of the physical properties of plasticization efficiency and migration/loss properties may be adjusted, and mechanical properties such as tensile strength and elongation rate, and stress resistance may be maintained to the same or better level.

Through this, the environmental issues of the conventional phthalate-based products may be removed, and products with further improved loss properties may be achieved, and products with markedly improved balance among physical properties in contrast to the conventionally used products may be achieved.

According to an embodiment of the present invention, $R_4$ of Formula 1 as a citrate included in the citrate-based composition is hydrogen. If $R_4$ is hydrogen, generally, excellent plasticization efficiency, migration resistance, and light resistance may be accomplished, and advantages of maintaining an absorption rate to a suitable level may be achieved.

The method for preparing the plasticizer composition according to an embodiment of the present invention is a known method in the art, and any methods for preparing the above-described plasticizer composition may be applied without specific limitation.

For example, the isophthalate-based composition may be prepared through the direct esterification reaction of the alcohol mixture of the isomer mixture of hexyl alcohols and 2-ethylhexanol with isophthalic acid or anhydride thereof, and the citrate-based composition may be prepared through the direct esterification reaction of citric acid or anhydride thereof with the isomer mixture of hexyl alcohols.

In addition, the isophthalate-based composition may be prepared by the transesterification reaction of di(2-ethylhexyl) isophthalate with the isomer mixture of hexyl alcohols, and the citrate-based composition may be prepared by the transesterification reaction of trihexyl citrate with the isomer mixture of hexyl alcohols.

The plasticizer composition according to an embodiment of the present invention is a material prepared by suitably performing the esterification reaction, and the preparation method is not specifically limited only if the above-described conditions are satisfied, particularly, if the ratio of the branched alcohol in the isomer mixture alcohol is controlled, and specific components are included.

For example, the direct esterification reaction may be performed by a step of injecting an acid or a derivative thereof and two or more mixture alcohols, adding a catalyst and reacting under a nitrogen atmosphere; a step of removing an unreacted raw material; a step of neutralizing (or deactivating) the unreacted raw material and the catalyst; and a step of removing (for example, distillation under a reduced pressure) impurities and filtering.

The components of the isomer mixture of hexyl alcohols and the weight ratio of the components are the same as described above. In the direct esterification reaction, the alcohol may be used in a range of 150 to 900 mol %, 200 to 700 mol %, 200 to 600 mol %, 250 to 500 mol %, or 270 to 400 mol % based on 100 mol % of the acid, and by controlling the amount of the alcohol, the component ratio in a final composition may be controlled.

The catalyst may be, for example, one or more selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfate, a metal salt such as aluminum lactate, lithium fluoride, potassium chloride, cesium chloride, calcium chloride, iron chloride, and aluminum phosphate, a metal oxide such as heteropoly acids, natural/synthetic zeolites, cation and anion exchange resins, and an organometal such as tetra alkyl titanate and the polymers thereof. In a particular embodiment, the catalyst may use tetra alkyl titanate. Preferably, as an acid catalyst having low activation temperature, paratoluenesulfonic acid, methanesulfonic acid, or the like, may be suitable.

The amount used of the catalyst may be different according to the type thereof, and for example, a homogeneous catalyst may be used in a range of 0.01 to 5 wt %, 0.01 to 3 wt %, 1 to 5 wt % or 2 to 4 wt % based on total 100 wt % of the reactants, and a heterogeneous catalyst may be used in a range of 5 to 200 wt %, 5 to 100 wt %, 20 to 200 wt %, or 20 to 150 wt % based on the total weight of the reactants.

In this case, the reaction temperature may be within a range of 100 to 280° C., 100 to 250° C., or 120 to 230° C.

In another embodiment, the transesterification reaction may be reaction of an isophthalate or a citrate, and an alcohol having an alkyl radical different from the alkyl radical of the isophthalate or citrate. Here, the alkyl groups of the ester and alcohol may be exchanged.

"Transesterification reaction" used in the present invention means the reaction of an alcohol and an ester to interchange the alkyl of the ester with the alkyl of the alcohol.

The composition ratio of the mixture prepared through the transesterification reaction may be controlled according to the addition amount of the alcohol. The amount added of the alcohol may be 0.1 to 200 parts by weight, particularly, 1 to 150 parts by weight, more particularly, 5 to 100 parts by weight based on 100 parts by weight of the isophthalate or citrate. For reference, the determination of the component ratio in a final composition may be the amount added of the alcohol like in the direct esterification reaction.

According to an embodiment of the present invention, the transesterification reaction may be performed at a reaction temperature of 120° C. to 190° C., preferably, 135° C. to 180° C., more preferably, 141° C. to 179° C. for 10 minutes to 10 hours, preferably, 30 minutes to 8 hours, more preferably, 1 to 6 hours. Within the temperature and time ranges, the composition ratio of a final plasticizer composition may be efficiently controlled. In this case, the reaction time may be calculated from a point where the reaction temperature is achieved after elevating the temperature of the reactants.

The transesterification reaction may be performed under an acid catalyst or a metal catalyst, and in this case, the effects of reducing the reaction time may be achieved.

The acid catalyst may include, for example, sulfuric acid, methanesulfonic acid or p-toluenesulfonic acid, and the metal catalyst may include, for example, an organometal catalyst, a metal oxide catalyst, a metal salt catalyst, or a metal itself.

The metal component may be, for example, any one selected from the group consisting of tin, titanium and zirconium, or a mixture of two or more thereof.

In addition, a step of removing unreacted alcohol and reaction by-products by distillation may be further included after the transesterification reaction. The distillation may be, for example, a two-step distillation by which the alcohol and the by-products are individually separated using the difference of the boiling points. In another embodiment, the distillation may be mixture distillation. In this case, effects of relatively stable securing of an ester-based plasticizer composition in a desired composition ratio may be achieved. The mixture distillation means distillation of the unreacted alcohol and the by-products simultaneously.

According to another embodiment of the present invention, a resin composition including the aforementioned plasticizer composition and a resin is provided.

The resin may use resins well-known in the art. For example, a mixture of one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, polylactic acid, natural rubber, synthetic rubber and thermoplastic elastomer may be used, without limitation.

The plasticizer composition may be included in 5 to 150 parts by weight, preferably, 5 to 130 parts by weight, or 10 to 120 parts by weight based on 100 parts by weight of the resin.

Generally, the resin using the plasticizer composition may be prepared into a resin product through a melt processing or a plastisol processing, and a resin by the melt processing and a resin from the plastisol processing may be produced differently according to each polymerization method.

For example, in the case of using a vinyl chloride polymer in a melt processing, solid phase resin particles having a large average particle diameter are prepared by suspension polymerization, or the like and used, and the vinyl chloride polymer is referred to as a straight vinyl chloride polymer. In the case of using a vinyl chloride polymer in a plastisol processing, a sol state resin as minute resin particles are prepared by emulsion polymerization, or the like and used, and this vinyl chloride polymer is referred to as a paste vinyl chloride resin.

In the case of the straight vinyl chloride polymer, a plasticizer may preferably be included in a range of 5 to 80 parts by weight based on 100 parts by weight of the polymer, and in the case of the paste vinyl chloride polymer, the plasticizer may preferably be included in a range of 40 to 120 parts by weight based on 100 parts by weight of the polymer.

The resin composition may further include a filler. The filler may be 0 to 300 parts by weight, preferably, 50 to 200 parts by weight, more preferably, 100 to 200 parts by weight based on 100 parts by weight of the resin.

The filler may use fillers well-known in the art and is not specifically limited. For example, the filler may be a mixture of one or more types selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition may further include other additives such as a stabilizer as necessary. Each of the other additives such as the stabilizer may be, for example, 0 to 20 parts by weight, preferably, 1 to 15 parts by weight based on 100 parts by weight of the resin.

The stabilizer may use, for example, a calcium-zinc-based (Ca—Zn-based) stabilizer such as a composite stearate of calcium-zinc or a barium-zinc-based (Ba—Zn-based) stabilizer, but is not specifically limited.

The resin composition may be applied to both a melt processing and a plastisol processing as described above, and a calendaring processing, an extrusion processing, or an injection processing may be applied to the melt processing, and a coating processing, or the like may be applied to the plastisol processing.

EXAMPLES

Hereinafter, embodiments will be explained in detail to particularly explain the present invention. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

The contents of the components in the isomer mixture of hexyl alcohols were analyzed by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 μl, initial value: 70° C./4.2 min, end value: 280° C./7.8 min, program rate: 15° C./min).

Preparation Example 1. Preparation of Isophthalate-Based Composition

To a four-necked, 3 liter reactor equipped with a cooler, a condenser, a decanter, a reflux pump, a temperature controller, and a stirrer, 498 g of isophthalic acid, 343 g of an isomer mixture of hexyl alcohols, 656 g of 2-ethylhexanol, and 1.5 g of a tetra isopropyl titanate catalyst were injected, the reaction temperature was set to 220° C., and direct esterification reaction was performed for about 8 hours, while continuously injecting a nitrogen gas. At a point where an acid value reached 0.1, the reaction was finished.

After finishing the reaction, in order to remove an unreacted raw material, distillation extraction was performed under a reduced pressure. After the distillation extraction, a neutralization process, a dehydration process and a filtering process were performed to obtain an isophthalate-based composition including dihexyl isophthalate, hexyl(2-ethylhexyl) isophthalate and di(2-ethylhexyl) isophthalate.

In addition to the composition, multiple types of isophthalate-based compositions were prepared by changing the type and composition of isomers included in the isomer mixture of hexyl alcohols, used during the procedure, and the composition ratio of the isomer mixture of hexyl alcohols and 2-ethylhexanol, and the composition of the isomer mixture of hexyl alcohols, used in each case, and the composition ratio of the isomer mixture of hexyl alcohols and 2-ethylhexanol are summarized in Table 1 below. Meanwhile, in this Preparation Example, "hexyl" is an expression collectively referring to all hexyl groups having various structures, derived from the isomer mixture of hexyl alcohols.

TABLE 1

| | Composition of isomer mixture of hexyl alcohols (weight ratio) | Weight ratio of 2-ethylhexanol:hexyl alcohol |
|---|---|---|
| Preparation Example 1-1 | 2-methylpentanol:3-methylpentanol = 5:5 | 66:34 |
| Preparation Example 1-2 | 2-methylpentanol:3-methylpentanol:1-hexanol = 4:4:2 | 66:34 |
| Preparation Example 1-3 | 2-methylpentanol:3-methylpentanol:cyclopentyl methanol = 4:4:2 | 66:34 |
| Preparation Example 1-4 | 2-methylpentanol:3-methylpentanol:4-methylpentanol = 4:4:2 | 66:34 |
| Preparation Example 1-5 | 2-methylpentanol:3-methylpentanol:4-methylpentanol:1-hexanol:cyclopentyl methanol = 38:41:4:11:6 | 66:34 |
| Preparation Example 1-6 | 2-methylpentanol:3-methylpentanol:4-methylpentanol:1-hexanol:cyclopentyl methanol = 38:41:4:11:6 | 30:70 |
| Preparation Example 1-7 | 2-methylpentanol:3-methylpentanol:4-methylpentanol:1-hexanol:cyclopentyl methanol = 38:41:4:11:6 | 70:30 |
| Preparation Example 1-8 | 2-methylpentanol:3-methylpentanol:4-methylpentanol:1-hexanol:cyclopentyl methanol = 38:41:4:11:6 | 90:10 |

Preparation Example 2. Preparation of Citrate-Based Composition

To a four-necked, 3 liter reactor equipped with a cooler, a condenser, a decanter, a reflux pump, a temperature controller, and a stirrer, 384 g of citric acid, 857 g of an isomer mixture of hexyl alcohols, and 1.5 g of a tetra isopropyl titanate catalyst were injected, the reaction temperature was set to 200° C., and direct esterification reaction was performed for about 8 hours, while continuously injecting a nitrogen gas. At a point where an acid value reached 1, the reaction was finished.

After finishing the reaction, in order to remove an unreacted raw material, distillation extraction was performed under a reduced pressure. After the distillation extraction, a neutralization process, a dehydration process and a filtering process were performed to obtain a citrate-based composition including trihexyl citrate.

In addition to the composition, multiple types of citrate-based compositions were prepared by changing the type of isomers included in the isomer mixture of hexyl alcohols, used during the procedure, and the compositions of each isomer, and the composition of the isomer mixture of hexyl alcohols used in each case, are summarized in Table 2 below. Meanwhile, in this Preparation Example, "hexyl" is an expression collectively referring to all hexyl groups having various structures, derived from the isomer mixture of hexyl alcohols.

TABLE 2

| | Composition of isomer mixture of hexyl alcohols (weight ratio) |
|---|---|
| Preparation Example 2-1 | 2-methylpentanol:3-methylpentanol:4-methylpentanol:1-hexanol:cyclopentyl methanol = 38:41:4:11:6 |
| Preparation Example 2-2 | 2-methylpentanol:3-methylpentanol = 5:5 |
| Preparation Example 2-3 | 2-methylpentanol:3-methylpentanol:1-hexanol = 4:4:2 |

EXAMPLES

The isophthalate-based composition and the citrate-based composition prepared above were mixed in a specific weight ratio to prepare a plasticizer composition. The types of the isophthalate-based composition and the citrate-based composition used in each Example and the weight ratio therebetween are summarized in Table 3 below.

TABLE 3

| | Isophthalate-based composition | Citrate-based composition | Weight ratio of isophthalate:citrate |
|---|---|---|---|
| Example 1-1 | Preparation Example 1-1 | Preparation Example 2-1 | 8:2 |
| Example 1-2 | Preparation Example 1-2 | Preparation Example 2-1 | 8:2 |
| Example 1-3 | Preparation Example 1-3 | Preparation Example 2-1 | 8:2 |
| Example 1-4 | Preparation Example 1-4 | Preparation Example 2-1 | 8:2 |
| Example 1-5 | Preparation Example 1-5 | Preparation Example 2-1 | 8:2 |
| Example 2-1 | Preparation Example 1-6 | Preparation Example 2-1 | 8:2 |
| Example 2-2 | Preparation Example 1-7 | Preparation Example 2-1 | 8:2 |
| Example 2-3 | Preparation Example 1-8 | Preparation Example 2-1 | 8:2 |
| Example 3-1 | Preparation Example 1-5 | Preparation Example 2-2 | 8:2 |
| Example 3-2 | Preparation Example 1-5 | Preparation Example 2-3 | 8:2 |

TABLE 3-continued

| | Isophthalate-based composition | Citrate-based composition | Weight ratio of isophthalate:citrate |
|---|---|---|---|
| Example 4-1 | Preparation Example 1-5 | Preparation Example 2-1 | 1:9 |
| Example 4-2 | Preparation Example 1-5 | Preparation Example 2-1 | 3:7 |
| Example 4-3 | Preparation Example 1-5 | Preparation Example 2-1 | 5:5 |
| Example 4-4 | Preparation Example 1-5 | Preparation Example 2-1 | 9:1 |

Comparative Examples 1 to 4

Four types of the conventionally used plasticizers were used as Comparative Examples 1 to 4. Dioctyl phthalate (DOP) was used as Comparative Example 1, diisononyl phthalate (DINP) was used as Comparative Example 2, di(2-ethylhexyl) terephthalate (product name: GL300, manufacturer: LG Chem,) was used as Comparative Example 3, and a mixture of di(2-ethylhexyl) terephthalate, butyl(2-ethylhexyl) terephthalate and dibutyl terephthalate (product name: GL500, manufacturer: LG Chem,) was used as Comparative Example 4.

Comparative Examples 5 and 6

The isophthalate-based composition prepared in Preparation Example 1-5 was used as a sole plasticizer in Comparative Example 5, and the citrate-based composition prepared in Preparation Example 2-1 was used as a sole plasticizer in Comparative Example 6.

Experimental Example 1: Sheet Performance Evaluation

By using the plasticizers of the Examples and the Comparative Examples, specimens were manufactured according to ASTM D638 and the prescription and manufacturing conditions below.

(1) Prescription: 100 parts by weight of a straight vinyl chloride polymer (LS100), 50 parts by weight of a plasticizer and 3 parts by weight of a stabilizer (BZ-153T)

(2) Mixing: mixing at 98° C. in 700 rpm (3) Manufacture of specimen: manufacturing 1T, 2T and 3T sheets by processing at 160° C. for 4 minutes by a roll mill, and at 180° C. for 2.5 minutes (low pressure) and 2 minutes (high pressure) by a press (4) Test items 1) Hardness: Shore hardness (Shore "A" and "D") at 25° C. was measured using a 3T specimen for 10 seconds using ASTM D2240. The plasticization efficiency was assessed excellent if the value was small.

2) Tensile strength: By an ASTM D638 method, a specimen was drawn in a cross-head speed of 200 mm/min using a test apparatus of U.T.M (manufacturer: Instron, model name: 4466), and a point where the 1T specimen was cut was measured. The tensile strength was calculated as follows.

Tensile strength ($kgf/cm^2$)=load value (kgf)/thickness (cm)×width (cm)

3) Elongation rate measurement: By an ASTM D638 method, a specimen was drawn in a cross-head speed of 200 mm/min using a test apparatus of U.T.M, and a point where the 1T specimen was cut was measured. The elongation rate was calculated as follows.

Elongation rate (%)=length after elongation/initial length×100

4) Migration loss measurement: According to KSM-3156, a specimen with a thickness of 2 mm or more was obtained, glass plates were attached onto both sides of the 1T specimen, and a load of 1 kgf/cm 2 was applied. The specimen was stood in a hot air circulation type oven (80° C.) for 72 hours and then taken out and cooled at room temperature for 4 hours. Then, the glass plates attached onto both sides of the specimen were removed, the weights before and after standing a glass plate and a specimen plate in the oven were measured, and the migration loss was calculated as follows.

Migration loss (%)={(initial weight of specimen at room temperature−weight of specimen after standing in oven)/initial weight of specimen at room temperature}×100

5) Volatile loss measurement: The specimen manufactured was processed at 80° C. for 72 hours, and the weight of the specimen was measured.

Volatile loss (wt %)=weight of initial specimen−(weight of specimen after processing at 80° C. for 72 hours)/weight of initial specimen×100

6) Stress test (stress resistance): A specimen with a thickness of 2 mm in a bent state was stood at 23° C. for 168 hours, and the degree of migration (degree of oozing) was observed. The results were recorded as numerical values, and excellent properties were shown if the quantity was closer to 0.

7) Absorption rate measurement

An absorption rate was evaluated by measuring the time consumed for mixing a resin and an ester compound until stabilizing the torque of a mixer by using a planatary mixer (Brabender, P600) under conditions of 77° C. and 60 rpm.

The evaluation results on the test items of the Examples and Comparative Examples are summarized in Table 4 and 5 below.

TABLE 4

| Division | Hardness Shore A | Hardness Shore D | Mechanical properties Tensile strength ($kgf/cm^2$) | Mechanical properties Elongation rate (%) | Migration loss (%) | Volatile loss (%) |
|---|---|---|---|---|---|---|
| Example 1-1 | 84.6 | 38.1 | 221.4 | 318.9 | 3.56 | 1.35 |
| Example 1-2 | 84.3 | 37.7 | 225.6 | 320.5 | 3.30 | 1.34 |
| Example 1-3 | 84.5 | 38.9 | 220.4 | 322.1 | 3.10 | 1.05 |
| Example 1-4 | 84.4 | 37.5 | 220.3 | 320.4 | 3.44 | 1.35 |
| Example 1-5 | 84.1 | 38.8 | 220.5 | 321.8 | 3.75 | 1.58 |
| Example 2-1 | 81.2 | 33.5 | 211.4 | 330.5 | 1.60 | 1.88 |
| Example 2-2 | 84.5 | 39.0 | 228.7 | 330.5 | 3.21 | 1.02 |
| Example 2-3 | 85.1 | 34.0 | 229.7 | 325.6 | 3.54 | 1.10 |
| Example 3-1 | 84.0 | 38.6 | 224.3 | 325.7 | 3.41 | 1.45 |
| Example 3-2 | 84.0 | 38.7 | 225.3 | 323.8 | 3.50 | 1.48 |
| Example 4-1 | 84.1 | 37.3 | 214.8 | 337.9 | 1.65 | 1.20 |
| Example 4-2 | 84.3 | 37.4 | 213.4 | 325.7 | 1.80 | 1.33 |
| Example 4-3 | 84.8 | 38.2 | 215.6 | 328.9 | 2.35 | 1.58 |
| Example 4-4 | 84.6 | 39.0 | 218.8 | 320.5 | 2.69 | 1.84 |
| Comparative Example 1 | 84.4 | 38.7 | 200.6 | 297.4 | 1.74 | 1.60 |
| Comparative Example 2 | 86.9 | 41.1 | 209.7 | 308.9 | 2.38 | 0.69 |
| Comparative Example 3 | 88.6 | 42.5 | 216.1 | 300.7 | 6.88 | 0.82 |
| Comparative Example 4 | 85.2 | 39.7 | 220.5 | 307.3 | 5.68 | 3.05 |
| Comparative Example 5 | 85.0 | 39.3 | 217.6 | 304.2 | 4.15 | 2.59 |
| Comparative Example 6 | 84.1 | 37.2 | 208.5 | 337.5 | 1.62 | 1.09 |

TABLE 5

| Division | Stress test | Absorption rate (mm:ss) |
|---|---|---|
| Example 1-1 | 0.5 | 5:25 |
| Example 1-2 | 0.5 | 5:20 |
| Example 1-3 | 0.5 | 5:25 |
| Example 1-4 | 0.5 | 5:20 |
| Example 1-5 | 0.5 | 5:25 |
| Example 2-1 | 0.0 | 4:15 |
| Example 2-2 | 0.5 | 5:50 |
| Example 2-3 | 1.0 | 6:00 |
| Example 3-1 | 0.5 | 5:30 |
| Example 3-2 | 0.5 | 5:35 |
| Example 4-1 | 0.5 | 5:55 |
| Example 4-2 | 0.5 | 5:55 |
| Example 4-3 | 0.5 | 5:50 |
| Example 4-4 | 0.5 | 5:49 |
| Comparative Example 1 | 0.5 | 5:30 |
| Comparative Example 2 | 0.5 | 6:50 |
| Comparative Example 3 | 3.0 | 7:30 |
| Comparative Example 4 | 1.5 | 5:30 |
| Comparative Example 5 | 1.5 | 5:40 |
| Comparative Example 6 | 0.5 | 5:35 |

Referring to the results of Table 4 and 5, it could be confirmed that the plasticizer compositions according to embodiments of the present invention showed the same or better plasticization efficiency and excellent effects in respect of mechanical properties, migration resistance and thermal stability in contrast to the plasticizer compositions of Comparative Examples 1 to 4, which are the conventional plasticizer products.

Particularly, Comparative Examples 1 and 2 are the most commonly used phthalate-based plasticizer products, and the Examples of the present invention showed the similar level of plasticization efficiency as Comparative Example 1 and improved effects of mechanical properties such as tensile strength and elongation rate in contrast to Comparative Example 1. In addition, in contrast to Comparative Example 2, the Examples of the present invention showed improved plasticization efficiency and elongation rate, and similar results of remaining physical properties. Considering that the use of the plasticizer products of Comparative Examples 1 and 2 is not easy nowadays due to environmental regulations, it could be confirmed that the plasticizer compositions according to the Examples of the present invention could be sufficiently used as eco-friendly replacements of the conventional plasticizer products.

In addition, Comparative Examples 3 and 4 are eco-friendly plasticizers for replacing Comparative Examples 1 and 2, and it could be confirmed that the plasticizer compositions of Comparative Examples 3 and 4 showed markedly degraded plasticization efficiency, migration resistance and stress resistance in contrast to the plasticizer compositions of the Examples of the present invention. If the migration resistance and stress resistance are inferior as in Comparative Examples 3 and 4, there are fatal defects in that the plasticizer mixed in a resin composition might be easily eluted and do harm to the human body.

Comparative Examples 5 and 6 used any one among the isophthalate-based composition and the citrate-based composition, which are the plasticizer compositions of the Examples of the present invention, and the case of Comparative Example 5 using only the isophthalate-based composition showed inferior results in contrast to the Examples in respect of plasticization efficiency, elongation rate, migration loss and volatile loss, and the case of Comparative Example 6 using only the citrate-based composition showed largely inferior tensile strength in contrast to the Examples, and showed defects in that the plasticized product might be easily broken. Particularly, if comparing Example 4-4 in which the isophthalate-based composition and the citrate-based composition were mixed in a weight ratio of 9:1 to Comparative Example 5 in which only the isophthalate-based composition was used, it could be confirmed that Comparative Example 5 showed large degradation of elongation rate and large increase of migration loss and volatile loss, and from this, it could be confirmed that mechanical properties and migration resistance could be improved even a small amount of the citrate-based composition is included in the plasticizer composition. In addition, if comparing Example 4-1 in which the isophthalate-based composition and the citrate-based composition were mixed in a weight ratio of 1:9 to Comparative Example 6 in which only the citrate-based composition was used, it could be confirmed that the tensile strength of Example 4-1 was better with almost similar other physical properties when compared to Comparative Example 6. From this, it could be confirmed that the isophthalate-based composition included in the plasticizer composition could improve the whole tensile strength of the plasticizer composition.

From the results, it could be confirmed that if the isophthalate-based composition and the citrate-based composition are used in combination, derivatives from an isomer mixture of hexyl alcohols are used as the alkyl radicals of the isophthalate-based composition and the citrate-based composition, and an hexyl group and a 2-ethylhexyl group are applied as the alkyl radicals of the isophthalate-based composition, eco-friendliness and the same or better performance in contrast to the conventional plasticizer products could be achieved, and the conventional plasticizer products could be successfully replaced.

Experimental Example 2: Evaluation of Carbonization Properties

Specimens with a size of 40 cm×40 cm and a thickness of 0.25 mm were manufactured under the same conditions as in Experimental Example 1, using the plasticizer compositions of Example 1-5 and Comparative Examples 1 to 4, and 6. With respect to the specimens manufactured, carbonization test was conducted in a Mathis oven at 230° C. in a rate of 5 mm/10 sec, and the results are shown in FIG. 1.

As confirmed through FIG. 1, the plasticizer composition according to Example 1-5 of the present invention showed excellent carbonization properties which are similar to those of the conventional plasticizer products, but the plasticizer composition of Comparative Example 6, using only the citrate showed extremely inferior carbonization properties. This means that discoloration phenomenon occurred when exposed to a high temperature due to the inferior thermal stability of the citrate compound itself, and it could be confirmed that the plasticizer composition of the present invention overcame such defects of the citrate-based compound itself through mixing with an isophthalate.

Experimental Example 3: Evaluation of Light Resistance

Specimens were manufactured using the plasticizer compositions of Example 1-5 and Comparative Examples 1 to 4, and light resistance was evaluated. By a method of ASTM 4329, the specimens were fixed on a specimen holder in a test equipment of QW Accelerated Weathering Tester (manufacturer: Q-LAB, model name: QUV/se) and exposed to UV (UVBA-340) at a certain temperature (60 degrees) for a certain time, and after 200 hours and 400 hours from this test, the specimens were taken out, and color change (ΔE) and yellow index (YI) were measured before and after this experiment. If the numerical of the color change is small, it means that the color change is little, and if the numerical is small, it is evaluated that light resistance is excellent. If the numerical of the yellow index increases, it means that yellowing phenomenon occurred more severely. Accordingly, if the numerical is small, the light resistance is evaluated excellent. The evaluation results of the light resistance are summarized in Table 6 below.

TABLE 6

| | ΔE | | YI | | |
|---|---|---|---|---|---|
| Division | After 200 hours | After 400 hours | 0 hour | After 200 hours | After 400 hours |
| Example 1-5 | 0.94 | 1.06 | −7.87 | −8.63 | −9.08 |
| Comparative Example 1 | 0.52 | 0.78 | −8.44 | −8.49 | −7.39 |
| Comparative Example 2 | 0.47 | 0.71 | −8.23 | −9.51 | −7.21 |
| Comparative Example 3 | 3.43 | 8.77 | −8.31 | −3.29 | 5.45 |
| Comparative Example 4 | 2.86 | 8.93 | −8.23 | −4.12 | 5.09 |

As confirmed from Table 6 above, the plasticizer composition of the present invention could accomplish the same level of light resistance as that of Comparative Examples 1 and 2, which are the conventional plasticizer products, by mixing isophthalate which is known to show excellent light resistance with citrate, and using. On the contrary, it could be confirmed that the cases of the plasticizer compositions of Comparative Examples 3 and 4, used as the eco-friendly replacements of the conventional plasticizer products of Comparative Examples 1 and 2, showed markedly inferior light resistance in contrast to Example 1-5 or Comparative Examples 1 and 2. From this, it could be confirmed that the plasticizer composition of the present invention showed excellent physical properties overall as examined above, and excellent performance without inferiority in respect of carbonization properties and light resistance.

The invention claimed is:

1. A plasticizer composition comprising an isophthalate-based composition and a citrate-based composition, wherein the isophthalate-based composition comprises dihexyl isophthalate, hexyl(2-ethylhexyl) isophthalate and di(2-ethylhexyl) isophthalate, the citrate-based composition comprises trihexyl citrate, a hexyl group of the isophthalate and a hexyl group of the citrate are derived from an isomer mixture of hexyl alcohols, and the isomer mixture of hexyl alcohols comprises two or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol.

2. The plasticizer composition according to claim 1, wherein the isophthalate-based composition comprises: 0.5 to 50.0 wt % of dihexyl isophthalate; 3.0 to 70.0 wt % of hexyl(2-ethylhexyl) isophthalate; and 0.5 to 95.0 wt % of di(2-ethylhexyl) isophthalate.

3. The plasticizer composition according to claim 1, wherein the citrate-based composition further comprises, in addition to the trihexyl citrate, one or more citrates of Formula 1:

Formula 1

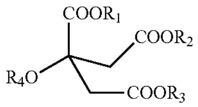

wherein, in Formula 1, $R_1$ to $R_3$ are each independently a n-hexyl group, a branched hexyl group or a cyclopentyl methyl group, and $R_4$ is hydrogen.

4. The plasticizer composition according to claim 1, wherein the isophthalate-based composition and the citrate-based composition are comprised in a weight ratio of 95:5 to 5:95.

5. The plasticizer composition according to claim 1, wherein the isophthalate-based composition and the citrate-based composition are comprised in a weight ratio of 95:5 to 50:50.

6. The plasticizer composition according to claim 1, wherein the isomer mixture of hexyl alcohols comprises 2-methylpentanol and 3-methylpentanol.

7. The plasticizer composition according to claim 1, wherein the isomer mixture of hexyl alcohols comprises 40 parts by weight or more of a branched alcohol based on 100 parts by weight of the isomer mixture.

8. The plasticizer composition according to claim 1, wherein the isomer mixture of hexyl alcohols comprises 50 to 95 parts by weight of a branched alcohol based on 100 parts by weight of the isomer mixture.

9. The plasticizer composition according to claim 6, wherein the isomer mixture of hexyl alcohols further comprises 1-hexanol.

10. The plasticizer composition according to claim 9, wherein the isomer mixture of hexyl alcohols comprises 40 parts by weight or less of the 1-hexanol based on 100 parts by weight of the isomer mixture.

11. The plasticizer composition according to claim 6, wherein the isomer mixture of hexyl alcohols further comprises 4-methylpentanol.

12. The plasticizer composition according to claim 6, wherein the isomer mixture of hexyl alcohols further comprises cyclopentyl methanol.

13. The plasticizer composition according to claim 12, wherein the isomer mixture of hexyl alcohols comprises 20 parts by weight or less of the cyclopentyl methanol based on 100 parts by weight of the isomer mixture.

14. A resin composition, comprising:

100 parts by weight of a resin; and 5 to 150 parts by weight of the plasticizer composition of claim 1.

15. The resin composition according to claim 14, wherein the resin comprises one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, and polylactic acid.

16. The plasticizer composition according to claim 9, wherein the isomer mixture of hexyl alcohols further comprises 4-methylpentanol.

17. The plasticizer composition according to claim 9, wherein the isomer mixture of hexyl alcohols further comprises cyclopentyl methanol.

18. The plasticizer composition according to claim 17, wherein the isomer mixture of hexyl alcohols comprises 20 parts by weight or less of the cyclopentyl methanol based on 100 parts by weight of the isomer mixture.

19. The resin composition according to claim 14, wherein the resin comprises one or more selected from the group consisting of natural rubber and synthetic rubber.

* * * * *